A. SILVERMAN.
ILLUMINATOR FOR MICROSCOPES.
APPLICATION FILED NOV. 13, 1917.
1,267,287. Patented May 21, 1918.
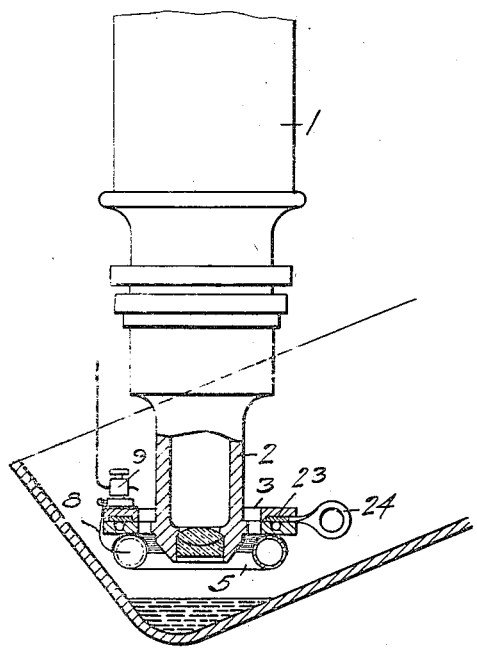
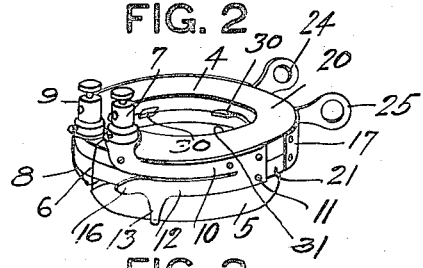
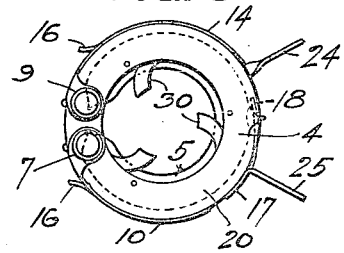
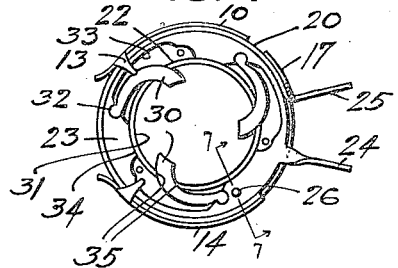
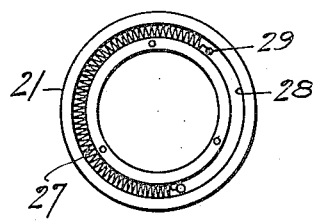
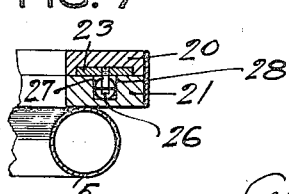
WITNESSES
J. R. Keller
S. F. Armstrong.
INVENTOR
Alexander Silverman
By Kay Totten Powell
attys

UNITED STATES PATENT OFFICE.

ALEXANDER SILVERMAN, OF PITTSBURGH, PENNSYLVANIA.

ILLUMINATOR FOR MICROSCOPES.

1,267,287. Specification of Letters Patent. Patented May 21, 1918.

Application filed November 13, 1917. Serial No. 201,743.

*To all whom it may concern:*

Be it known that I, ALEXANDER SILVERMAN, a citizen of the United States, and resident of Pittsburgh, in the county of Allegheny and State of Pennsylvania, have invented a new and useful Improvement in Illuminators for Microscopes; and I do hereby declare the following to be a full, clear, and exact description thereof.

My invention relates to magnifying instruments, microscopes and the like, and has particular reference to means for illuminating the field of the objective of these instruments.

The invention is devised primarily to provide artificial illumination for the field, or the object, and has special advantages when by reason of the nature or location of the field, or of the object, natural or other lighting of the field's zone as now employed is not available for efficient illumination, or requires adjustment or changes of the position of the microscope.

The invention also aims to provide means for amplifying the available light, if said light is insufficient. Insufficient light and light precluded from the field include instances when the field or the object to be observed is in a recess, the walls of which shroud the same in such manner as to cause the light to be insufficient for clear observation. For example, when the object, either transparent or opaque, must be supported on or contained in opaque supports or vessels which prevent or preclude the light, or deflect the light rays to prevent sufficient illumination.

Further objects are,—to include means for concentrating the light directly on the object to be examined; and distributing the light uniformly along the best lines for observation; protecting the eye of the observer from the light and adjusting the light with respect to the focal position of the objective lens, as that lens is adjusted.

The adjustment of the light relative to the objective of a microscope is of singular importance in this connection since the minute observations necessary require that the most perfect illumination,—both as to distance from the material observed, and the diffusion of the light over said material—is of the utmost importance in order to make not only accurate observation, but also to make photographic images through the microscope.

A still further object is to so arrange the supporting means for the lighting device that said supporting means will not in any way obstruct or be in the way of any laterally-projecting objective of the microscope when the lighting device is mounted adjacent the axial objective.

A further object is to make the device of compact and simple construction so that it may be left on the microscope; but one of the most important advantages is that my improved lamp is attached directly to and supported by the objective of the microscope. In practice, the objectives of microscopes are almost invariably limited within certain diameters; therefore, my improved form of lamp with its supporting means is adapted to be used practically with any objective now commonly made. This distinguishes the present form of my device from those heretofore employed, which were supported by means of clamps, which were to be clasped around the tube of the microscope. It is quite common practice to vary the diameters of these tubes within a considerable range. Consequently it was necessary to change the supporting clamp of the lamps heretofore used to adapt them to these tubes of different diameters.

The attaching of the lamp directly to the objective also has the further advantage that the supporting of the lamp does not depend in any way upon the length of the microscope tube; nor does it depend in any way upon the design of the objective support.

My improved method of clamping the lamp to the objective has the further advantage that the circular lamp will at all times be held equidistant from the center of the objective.

And a further object is the provision of improved means for attaching the lamp proper to its support.

With these and other objects in view, as will appear from the following detailed description, the invention consists in constructions and arrangements of parts, one particular embodiment of which is herein selected for illustration, in which Figure 1 is a view of so much of a microscope with the improved construction associated therewith as is necessary to illustrate; Fig. 2 is a perspective view of the lamp and its attaching means; Fig. 3 is a top view of the lamp and attaching means; Fig. 4 is an inverted plan view of the upper half of the attaching means; Fig. 5 is an inverted plan view of the lamp and attaching means; Fig. 6 is a top plan view of the lower half of the lamp support; and Fig. 7 is a cross section on the line 7—7, Fig. 5.

In the embodiment of my invention herein selected for illustration, 1 indicates the barrel or tube of the microscope having the objective 2 to which my improved illuminating device, indicated generally at 3, is attached.

Referring to Fig. 2, the device consists in general of the lamp support 4 and the lamp 5, the latter is of circular construction to practically surround the objective, and may be substantially of the form illustrated in my companion application, Serial No. 190,905, filed September 12, 1917. The terminals of the filament of the lamp lead out at 6 to a binding-post 7, and at 8 to a binding-post 9, to which also the wires from the source of current may be attached.

The manner of attaching the lamp 5 to the supporting member 4 as here devised is of particular advantage. As will be seen from inspection of Fig. 2, the supporting member 4 has attached thereto a metal band 10 secured by means of screws 11, one end of which also is held beneath the binding-post 7 for greater security. This metal band 10 has a spring-member 12 provided with a lamp-supporting finger 13 which clasps the lamp 5 and holds it on the support 4. The underside plan view of this construction is further shown in Fig. 5, which view also shows a second holding spring member 14 having a similar clamping or holding finger 15. These spring members 12 and 14 may be provided with finger members 16 by which they may be spread to release the lamp from the holder or support. The lamp is further held on the support 4 by means of a plate 17 having a downwardly-extending ringlike member 18, which engages a lug 19 on the rear side of the lamp.

By the construction just described, it will be seen that should the lamp become broken or otherwise injured, it may be readily removed from the holder and a new lamp substituted. At the same time, it will be seen that the lamp is at all times held by its supporting fingers exactly centered on the holder.

The means by which the holder is held and supported on the objective of the microscope is of the character known as the "iris" spring clamp, or a clamp in which the clamping fingers have an iris movement toward and from the circumference of the objective so that the action of the clamp is to center the holder accurately on the objective. In the embodiment of the clamping means here shown, the body portion of the holder is divided horizontally into an upper section 20 and a lower section 21, Figs. 2 and 7, these sections being preferably of hard rubber or like insulating material. The upper section is milled out or provided with a groove 22 in which is mounted a metal ring 23, having a finger piece 24 by which the ring may be revolved in its seat. In order to facilitate the revolving movement of the ring 23, a second finger piece 25 may be attached to the body of the holder, preferably forming a part of the holding-plate 17 for the lamp. The ring-plate 23 is provided with a pin 26, which projects downwardly and is attached to the end of a circular spiral spring 27 held within a groove 28 in the lower member 21 of the holder,—the opposite end of said spring being secured to the lower member of the holder as at 29. Thus the contractile force of the spring 24 tends to draw the ring plate 23 into position to spread or separate the finger pieces 24 and 25. By grasping these finger pieces with the thumb and finger, the ring may be revolved against the action of the spring to operate the clamping fingers in the manner to be described. These clamping fingers are illustrated at 30, Figs. 3, 4 and 5, and are of arc shape, having their inner ends projecting into the central opening 31 of the ringlike holder, and having their outer ends rounded, as at 32, to form hinge connections with like depressions or openings in the ring-plate 23. The ring-plate is also cut away at several points, as at 33, to permit the clamping fingers 30 to be drawn within the body portion of the holder.

The inner flange 34 of the upper section 20 of the body portion is apertured at 35 to receive the clamping fingers 30 and the walls of these apertures 35 form guides by which the clamping fingers 30 are directed in their movements both toward and from the center of the holder.

When, then, the finger piece 24 of the movable ring 23 and the stationary finger piece 25 are grasped, the circular movement of the ring will cause the clamping fingers to dilate to permit the fitting of the holder over the objective. When the holder is adjusted to the proper position releasing the finger 24 of the ring 23 will permit said ring to turn in the opposite direction under the influence of the spring 27, whereby the spring fingers 30 will be projected again toward the center of the holder and grasp the circumference of the objective.

It will be noticed that the clamping fingers 30 have an iris-like movement, that is to say, each of the fingers is capable of a constant equal movement toward and from the center of the holder, so that when these fingers contract they will at all times maintain the circular lamp equidistant from the axis of the objective.

It will be understood that the upper and lower sections 20 and 21, respectively, of the holder may be secured together by means of screws or other suitable means, whereby the clamping portions of the holder are securely held in proper and accurate position for other purposes.

While I have herein described a particular embodiment of my invention, including a particular construction and arrangement of parts, it is to be understood that the invention may be varied in details of construction and arrangements within the scope of the appended claims.

What I claim is:

1. An illuminator for microscopes and the like comprising a support adapted to be attached directly to the objective of the microscope, a source of light constructed and arranged to lie adjacent to and substantially surround the lens portion of the objective of the microscope carried by said support.

2. An illuminator for microscopes and the like comprising a removable support adapted to be attached directly to the objective of the microscope, a lamp adapted to lie adjacent to and substantially surround the objective of the microscope carried by said support, said support having means for holding the lamp at all times equidistant from the axis of the objective.

3. An illuminator for microscopes and the like comprising a lamp having means for removably attaching the same directly to the objective of a microscope and having means for maintaining the lamp at all times equidistant from the axes of objectives of different diameters.

4. An illuminator for microscopes and the like comprising a lamp adapted to lie adjacent to and substantially surround the objective of the microscope, said lamp being provided with clamping means so constructed and arranged that it may be attached to and supported directly on the objective and may be maintained at all times equi-distant from the axis of the objective.

5. An illuminator for microscopes and the like comprising a lamp adapted to lie adjacent to and substantially surround the objective of the microscope, said lamp being provided with an iris-like clamping means to support the lamp on said objective and maintain it at all times equidistant from the axis of the objective.

6. An illuminator for microscopes and the like comprising a lamp adapted to lie adjacent to and substantially surround the objective of the microscope, a ring-like support for said lamp having means for engagement with a support upon the objective of the microscope and having means for removably securing the lamp to said support.

7. An illuminator for microscopes and the like comprising a lamp adapted to lie adjacent to and substantially surround the objective of the microscope, a ring-shaped support for said lamp having means to attach the same to the objective, said support having spring fingers for removably attaching the lamp thereto.

8. An illuminator for microscopes and the like comprising a lamp adapted to lie adjacent to and substantially surround the objective of the microscope, a ring-shaped support for said lamp having means to attach the same to the objective, said support having spring fingers for removably attaching the lamp thereto, said spring fingers constructed to center the lamp on its supporting ring.

9. An illuminator for microscopes and the like comprising a lamp adapted to lie adjacent and substantially surround the objective of the microscope, a support for said lamp, said support having a revoluble ring, a plurality of iris-like clamping fingers adapted to be moved by said ring, means for moving said ring to hold said fingers normally in engagement with the objective of the microscope whereby the holder and lamp will be held at all times equidistant from the axis of the objective of the microscope.

10. An illuminator for microscopes and the like comprising a lamp adapted to lie adjacent to and substantially surround the objective of the microscope, a support for said lamp, said support having a revoluble ring, a plurality of iris-like clamping fingers adapted to be moved by said ring, a spring for revolving said ring to normally cause contraction of said clamping fingers whereby the lamp may be supported upon the objective of the microscope and maintained at all times equidistant from the axis of said objective.

11. The combination with a microscope of a lamp having means to attach the same directly to the objective of the microscope, said attaching means permitting the axial adjustment of the lamp with respect to the objective.

12. An illuminator for microscopes and the like comprising a removable support adapted to be attached directly to the objective of the microscope, a lamp adapted to lie adjacent to and substantially surround the objective of the microscope carried by said support, said supporting means permitting the axial adjustment of the lamp with respect to the objective.

In testimony whereof I, the said ALEXANDER SILVERMAN, have hereunto set my hand.

ALEXANDER SILVERMAN.

Witnesses:
JOHN F. WILL,
J. R. KELLER.